US009291279B2

(12) United States Patent
Wopper et al.

(10) Patent No.: US 9,291,279 B2
(45) Date of Patent: Mar. 22, 2016

(54) DIAPHRAGM VALVE HOUSING AND METHOD FOR PRODUCING A DIAPHRAGM VALVE HOUSING

(71) Applicant: BUERKERT WERKE GMBH, Ingelfingen (DE)

(72) Inventors: Andreas Wopper, Ingelfingen (DE); Claudia Reustlen, Oehringen (DE)

(73) Assignee: BUERKERT WERKE GMBH (DE)

( * ) Notice: Subject to any disclaimer, the term of this patent is extended or adjusted under 35 U.S.C. 154(b) by 44 days.

(21) Appl. No.: 14/180,155

(22) Filed: Feb. 13, 2014

(65) Prior Publication Data
US 2014/0224348 A1    Aug. 14, 2014

(30) Foreign Application Priority Data
Feb. 14, 2013    (DE) .......................... 10 2013 101 497

(51) Int. Cl.
*F16K 27/02*    (2006.01)
(52) U.S. Cl.
CPC ....... *F16K 27/0236* (2013.01); *Y10T 137/0491* (2015.04); *Y10T 137/6851* (2015.04)
(58) Field of Classification Search
CPC ..................... F16K 27/0236; Y10T 137/6851; Y10T 137/0491
See application file for complete search history.

(56) References Cited

U.S. PATENT DOCUMENTS

| 3,105,507 | A | * | 10/1963 | Dunmire | 137/73 |
| 3,756,560 | A | | 9/1973 | Siepmann | 251/367 |
| 5,176,176 | A | * | 1/1993 | Lewis et al. | 137/859 |
| 5,279,328 | A | * | 1/1994 | Linder et al. | 137/599.01 |
| 5,327,937 | A | | 7/1994 | Kato et al. | 137/863 |
| 5,377,956 | A | | 1/1995 | Müller | 251/331 |
| 5,577,523 | A | * | 11/1996 | Taylor | 137/15.18 |
| 6,789,781 | B2 | * | 9/2004 | Johnson | F16K 7/126 251/291 |
| 7,527,241 | B2 | | 5/2009 | Lodolo | 251/331 |

FOREIGN PATENT DOCUMENTS

| DE | 883372 | 7/1953 |
| DE | 1450575 | 9/1969 |
| DE | 102 23 824 | 12/2003 |
| GB | 1080902 | 8/1967 |

OTHER PUBLICATIONS

German Search Report issued in corresponding application No. 10 2013 101 497.6, dated Sep. 3, 2013 (8 pgs).

* cited by examiner

*Primary Examiner* — John K Fristoe, Jr.
*Assistant Examiner* — Daphne M Barry
(74) *Attorney, Agent, or Firm* — Hayes Soloway P.C.

(57) ABSTRACT

A diaphragm valve having at least two axially extending fluid passageways, which are aligned with each other and which extend towards each other, and a separation wall between the fluid passageways provides for the separation wall, if viewed in the longitudinal sectional view, to have a flatter and a steeper section for delimiting the fluid passageways. Moreover, a method for producing a diaphragm valve housing is provided.

16 Claims, 4 Drawing Sheets

DIAPHRAGM VALVE HOUSING AND METHOD FOR PRODUCING A DIAPHRAGM VALVE HOUSING

FIELD OF THE INVENTION

The invention relates to a diaphragm valve housing. Moreover, the invention relates to a method for producing a diaphragm valve housing.

BACKGROUND

Diaphragm valve housings have feed and discharge connections which open into fluid passageways. These two fluid passageways, which are aligned with each other and which have a common axial axis, are usually defined by pipe sections. Just before the separation wall, the passageways are bent to towards one side so that they run towards each other and open into the common valve chamber. This valve chamber is then closed by a diaphragm resting against the valve housing. In doing so, the diaphragm is clamped between the valve housing and the drive housing flanged onto the valve housing. In the drive housing, corresponding drives including rams and/or pistons are provided, which press the diaphragm against the valve seat or allow the diaphragm to lift off from the valve seat in order to establish a flow connection between the passageways or to disconnect them from each other.

The manufacturing of the valve housing with the obliquely extending passageway end sections is a laborious process. There are various methods for producing these passageway end sections, for example by producing them in a stepwise manner by way of so-called line milling. The surface is correspondingly rough and is subsequently polished, at times it may even be necessary to polish it by hand, because not all the parts are accessible to a machine. A diaphragm valve housing of the generic type is known from DE 102 23 824 B4. In this diaphragm valve housing, in particular the continuously rounded transition between the axial sections and the passageway end section running obliquely relative thereto is relatively expensive to manufacture.

It is the object of the invention to provide a diaphragm valve housing that can be produced in a more cost-effective manner as well as a method for producing such a diaphragm valve housing.

SUMMARY

The present invention provides a diaphragm valve housing having at least two axially extending fluid passageways which are aligned with each other and which extend towards each other, a separation wall between the fluid passageways, which has a free end towards a valve chamber and with a free end forms a valve seat that is located between mouth openings of the fluid passageways that lie next to each other, wherein the fluid passageways each have a cylindrical, preferably plain cylindrical axial section and an immediately following passageway end section extending laterally relative to the axial direction of the fluid passageways and obliquely towards each other in the direction of the valve chamber, which are separated by the separation wall. For delimiting the fluid for delimiting the fluid passageways the separation wall has for each fluid passageway, if viewed along an axial longitudinal section, a tapered section that is flatter with respect to the axial direction and is arranged close to the valve seat, and a steeper section with respect to the axial direction which is located adjacent to the tapered section.

Whilst in the prior art the entire passageway end section, if viewed along a longitudinal section, extends in a uniformly linear manner and eventually merges in a large radius into the axial section, the invention provides for an opposite solution relative thereto. According to the invention, the passageway end section is exactly not designed an as to extend in a rectilinear manner with a uniform taper. Rather, sections of different tapering angles are provided in the passageway end section. Closer to the opening, a tapered section is provided which is tapered so as to be flatter relative to the axial direction than in the section that follows, which is tapered at a steeper angle than the tapered section. This provides a kind of "step" or a transverse section enlargement in the passageway end section, if viewed from the opening of the respective passageways. As a result of the non-continuous wall extension, turbulences are therefore generated in the fluid coming from the opening. However, as has been found in trials, these turbulences are not disturbing, but with regard to particle deposits at the transition between the passageway end section and the axial section. The reason is that the turbulences swirl up deposits and cause them to be entrained by the flow. The steep section reduces the curve-shaped section that is difficult to manufacture and can be machine-produced, for example by way of axial sections that extend deep into the housing, which can be produced very simply by turning or drilling or milling. A further manufacturing possibility consists in producing this steeper section in subsections by way of milling starting from the opening, by simply orienting the cutter steeper relative to the axial direction. Thus, the diaphragm valve housing can altogether be machine-produced on a larger scale, and polishing is, if at all, necessary only on small surfaces, no that the overall manufacturing costs can be significantly reduced. As an alternative, a material removal method other than milling may be chosen, for example electrochemical material removal (ECM). The invention allows very simple directions of movement of electrode to be achieved, and at the same time little, if any, post-processing by polishing is required.

The tapered section and/or the steep section may be formed, if viewed along the longitudinal section, by a straight section, which means by a linear portion, which greatly simplifies manufacture. The reason is that the cutter does not need to traverse the housing line by line for this section and does not need to be oriented at different angles between the lines. Rather, the cutter can produce this part of the passageway end section, more accurately this section of the wall of the passageway end section, along a curve, which means preferably by hobbing.

It is particularly simple if the tapered section is implemented as a plane and thus as a surface that is inclined relative to the axial axis.

The steeper section may for example be implemented as a cylindrical surface or as a plane surface, in both cases manufacturing is relatively simple compared to the prior art.

The steeper section may extend radially to the axial direction, so that this steeper section is produced simply during milling or preferably turning of the axial sections and no additional step is necessary for this.

Preferably, the steeper section should form the transition to the adjacent axial section of the fluid passageway, so that preferably only two or a maximum of three differently tapered sections (if viewed in a longitudinal section) form the obliquely extending passageway end section.

Since the axial section of the fluid passageways preferably has a plain cylindrical shape, a lateral transition, in a radial view, which means in a top view onto the valve seat, is usually provided between the tapered section and the remaining wall section, which defines the passageway end section. According to one embodiment, the invention provides for the tapered section to merge into arc-shaped sections at its two opposite ends. These arc-shaped sections will then be the lateral, opposite ends of the separation wall.

The arc-shaped sections can merge directly into the steeper section between the arc-shaped sections and the axial section, which does not entail any laborious processing.

The housing should in addition have moulded thereto a lateral ring flange for attaching the diaphragm, with the valve seat connecting opposite sections of the ring flange together, which means it runs transversely to the adjacent valve chamber.

The fluid passageways have, if viewed in a top view onto the ring flange, for example a semi-circular mouth cross-section.

Moreover, the invention relates to a method for producing a diaphragm valve housing according to the invention. The method according to the invention provides for the tapered sections to be produced from a valve housing blank by removing material in particular by milling, and for producing the axial sections before or after the production of the tapered sections. The material is removed from one side of the blank, in particular from a lateral ring flange moulded thereto.

The valve housing blank according to the invention can be produced in various ways. For example, the housing is produced by forming from pipe sections and is subsequently for example processed by removing material. For higher requirements, the blank may also be a forged stainless steel blank or a casting blank. If manufacturing is carried out from a pipe section, the axial sections are preferably produced at the same time, or the inside of the wall can be post-processed by machine afterwards. The axial sections do not need to be exclusively machined by cutting into the solid material. When manufacturing is carried out by means of pipe sections, the separation wall may be produced prior to machining by way of laterally denting the pipe wall. However, the method according to the invention offers such a great savings potential that the blank may also be a solid block or cuboid, from which the housing is produced "from a whole piece". Such a method still offers cost advantages compared to before.

One option of the invention provides for initially producing the axial sections and subsequently the tapered sections, wherein during milling of the tapered sections, the cutter is fed (i.e. moved in feeding direction) at such a low level that the passageway end sections are already connected to the axial sections. This means that the so-called line milling (milling operations are conducted line by line) could possibly be completely omitted or at the least reduced to a minimum.

Upon producing the tapered section, the steeper section or sections of the latter should be removed or milled, or the steeper section is turned as early as during the production of the axial sections. In this case, the end wall generated during turning forms the steeper section, which therefore extends radially with respect to the axial direction of the axial section of the corresponding passageway. This radial surface can then even be chamfered in the transitional region to the tapered section.

As has already been explained, the transition of the passageway end sections to the axial section may optionally be finished by polishing. This transition may also be provided with a smaller radius. The radius itself does not have to be produced by grinding, but rather it is possible to use a cutter having a spherical end, by means of which the radius is generated during the milling process itself.

DETAILED DESCRIPTION

Figure 1:
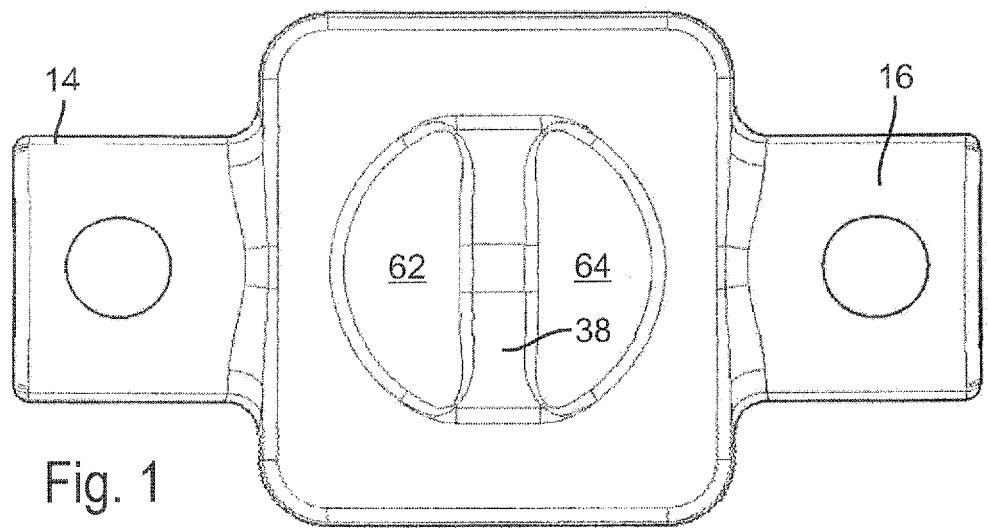
FIG. 1 shows a top view of a valve housing blank, from which the diaphragm valve housing according to the invention is produced.
Figure 2:
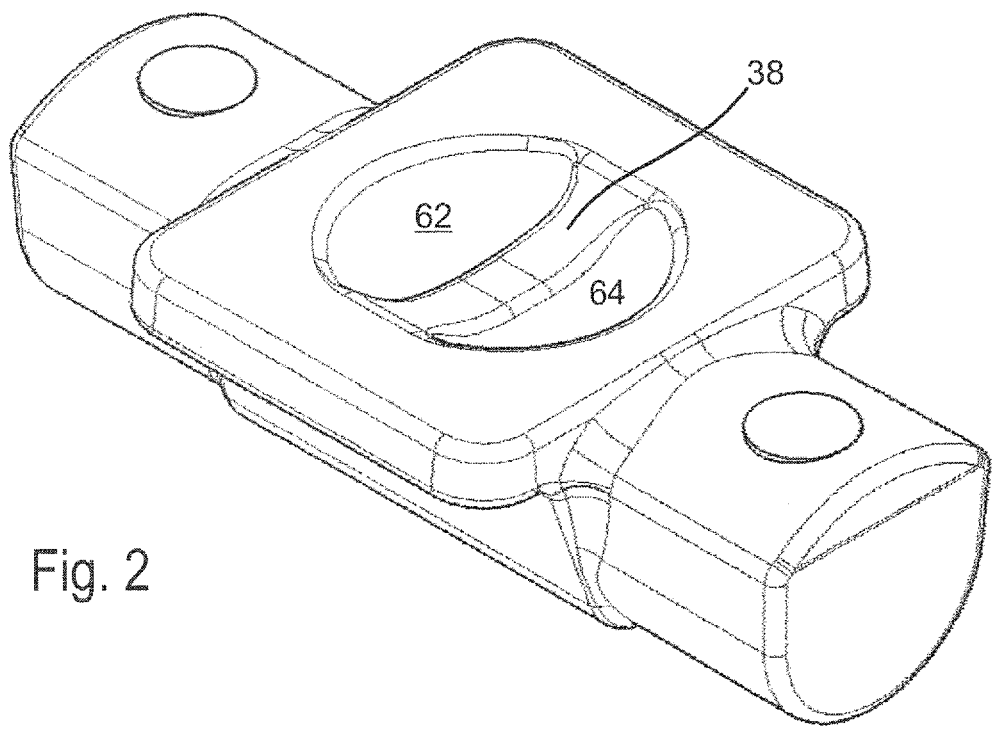
FIG. 2 shows a perspective view of the valve housing blank according to FIG. 1.
Figure 3:
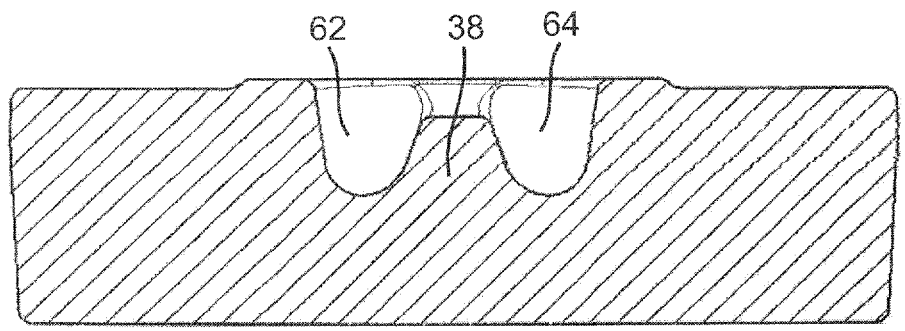
FIG. 3 shows a longitudinal sectional view through the valve housing blank according to FIG. 1.
Figure 6:
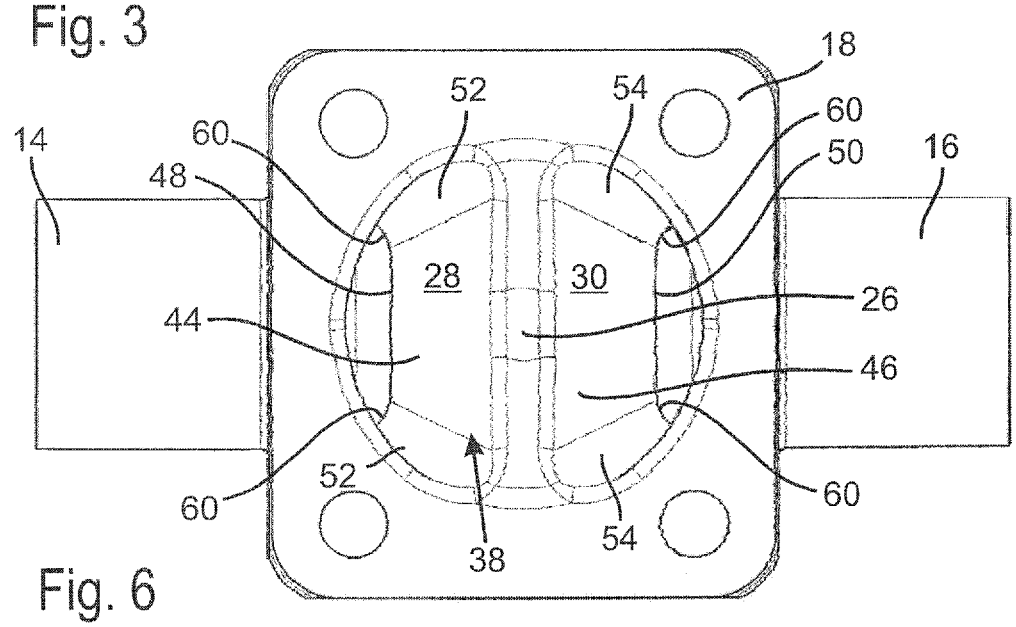
FIG. 6 shows a top view of a first embodiment of the diaphragm valve housing according to the invention.
Figure 7:
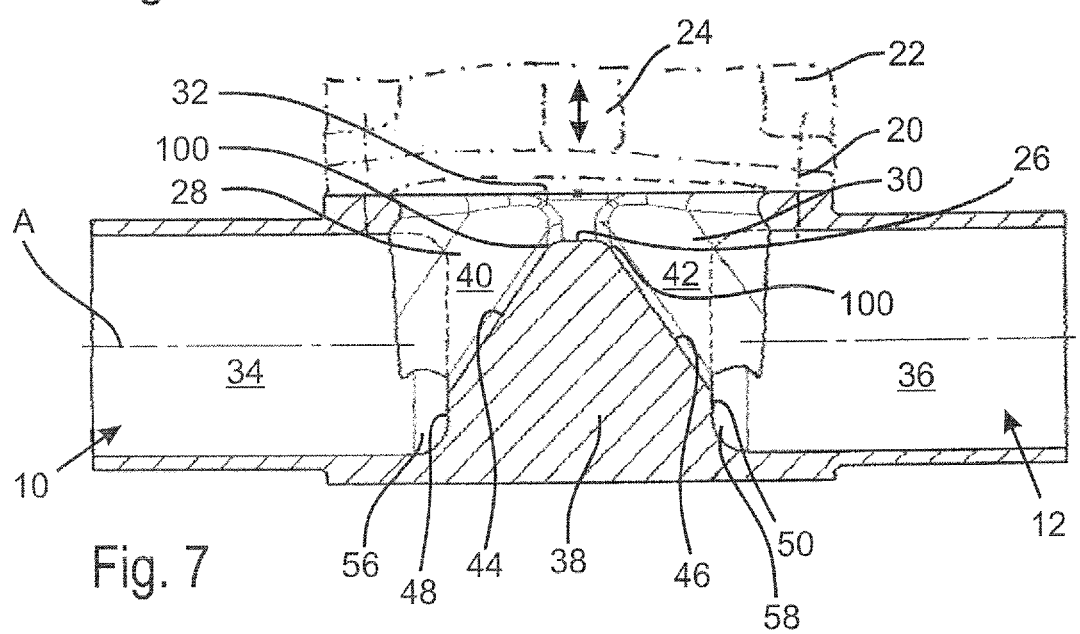
FIG. 7 shows a longitudinal sectional view through the diaphragm valve housing according to FIG. 6.

FIGS. 6 and 7 show a first embodiment of a diaphragm valve housing which is produced from an integral valve housing blank, for example as shown in FIGS. 1 to 3.

The diaphragm valve housing has two fluid passageways 10, 12 extending axially along a common central axis A, extending towards each other and being correspondingly aligned with each other. These fluid passageways 10, 12 partially extend into the socket-like tubular ends 14, 16, on which the diaphragm valve housing is connected to fluid lines.

Next to the socket-shaped ends 14, 16, the diaphragm valve housing has moulded thereon a lateral ring flange 18, which is preferably designed to be plane, extends parallel to the axis A and has a diaphragm 20 pressed against it (see FIG. 7).

The diaphragm 20 is pressed between the diaphragm valve housing and a drive housing 22, in which a pressure piece 24, which can be axially traversed by a drive, is radially supported. The drive for the pressure piece 24 may be a magnetic drive, a hydraulic, a pneumatic or any other drive. The pressure piece 24 rests against the rear side of the diaphragm 20 and can press the latter against a valve seat 26 in the diaphragm valve housing, in order to disconnect the flow connection between the two fluid passageways 10, 12.

The reason is that the fluid passageways 10, 12 each have a mouth opening 28 and 30, respectively, in the region of the flange 18, by means of which mouth opening the fluid passageways 10, 12 open into a common valve chamber 32 which is created above the valve seat 26 when the diaphragm 20 is lifted off. Via this valve chamber 32, the fluid passageways 10, 12 are optionally flow connected to each other.

Thus, the fluid passageways 10, 12 respectively have, with respect to FIG. 7, a plain cylindrical axial section 34 and 36, which is that section of the fluid passageways 10, 12, in which these axially extend and are oriented towards each other. The two axial sections 34, 36 terminate at a separation wall 38, which is an integral part of the valve housing. The separation wall 38 then defines in sections the passageway end sections 40 and 42, respectively, which respectively follow the axial sections 34, 36. These passageway end sections form the transition from the axial sections 34, 36 to the mouth openings 28 and 30, respectively, and extend, if viewed in the axial direction, obliquely towards each other and in the direction of the valve chamber 32. The respective passageway end sections 40, 42 are thus delimited, in sections, by the separation wall 38 and otherwise by lateral walls which are partially formed in the socket-shaped ends 14, 16 and partially on the flange 18.

FIG. 6 shows that the mouth openings 28, 30 are designed in a kidney shape or in the broadest sense to be semi-circular or in the shape of a circle segment, and the two flat sides are opposite each other. The valve seat 26 extends between the flat sides of the two kidney-shaped passageway mouths 28, 30 and forms the top side of the web-like separation wall 38 towards the valve chamber 32. This valve seat 26 is positioned slightly lower than the top side of the flange 80 and can also extend, if viewed in the axial direction, in a slightly arc-shaped manner, which means from the flanged surface towards the centre thereof below the level of the flange surface 18 and subsequently rising again to the level of the flange surface 18.

The separation wall 38 forms with its free end, as it were, the valve seat towards the valve chamber 32.

FIG. 7 shows that the separation wall 38 has several sections in order to delimit the two fluid passageways 10, 12. Proceeding from the valve seat 26, the separation wall 37 forms a tapered section 44, 46 that is close to the valve seat 26 and is flatter in the direction of the axial direction, i.e. of the axis A. as well as a steeper section 48, 50 which follows the latter. The flatter sections 44, 46 impart to the separation wall 38 a trapezoidal shape in this region (see FIG. 7).

In the embodiment according to FIGS. 6 and 7, the flatter tapered sections 44, 46 are respectively formed by a plane surface which can also be seen in FIG. 6. However, this is not to be understood in a limiting sense.

In this embodiment, the steeper sections 48, 50 are designed as surfaces that extend perpendicularly to the level of the flange surface 18 and in sections, preferably in the region in which they border on to the tapered sections 44, 46, as level radial surfaces, i.e. as surface sections that are perpendicular to the axis A.

FIG. 7 shows that the steep sections 48, 50 subsequently merge in a small radius into the respective cylinder wall that delimits the axial sections 34, 36.

The flat tapered sections 44, 46 terminate, in both lateral directions, see FIG. 6, in arc-shaped sections 52, 54.

If viewed from the valve seat 26 along the tapered sections 44, 46, an undercut, identified with reference numerals 56, 58, is thus formed due to the bend between the tapered sections 44, 46 and the steeper sections 48, 50.

If fluid flows from the fluid passageway 10 into the fluid passageway 12, turbulences are generated in the undercut 58, which would entrain any particles carried in the fluid from the undercut 58.

The tapered sections 44, 46 and, in the present embodiment, also the steep sections 48, 50, are respectively formed, if viewed along the longitudinal section, by straight sections.

In the embodiment illustrated, the arc-shaped sections 52, 54 merge into the steep section 48, 50, namely, in a top view (see FIG. 6), into a cylinder-segment-shaped section 60 of the steeper section 48, 50.

The method for producing the diaphragm valve housing according to FIGS. 6 and 7 will be explained below by means of FIGS. 1 to 5. The blank already forms indentations 62, 64 as well as an extension for the intermediate wall.

Preferably, initially the socket-shaped ends 14, 16 are processed on the outside and the inside, preferably by turning, so that first of all the two cylindrical axial sections 34, 36 are produced. During this turning process, the tool plunges into the blank to such a depth that the end side of the generated opening already forms the steeper section 48, 50.

Figure 4:
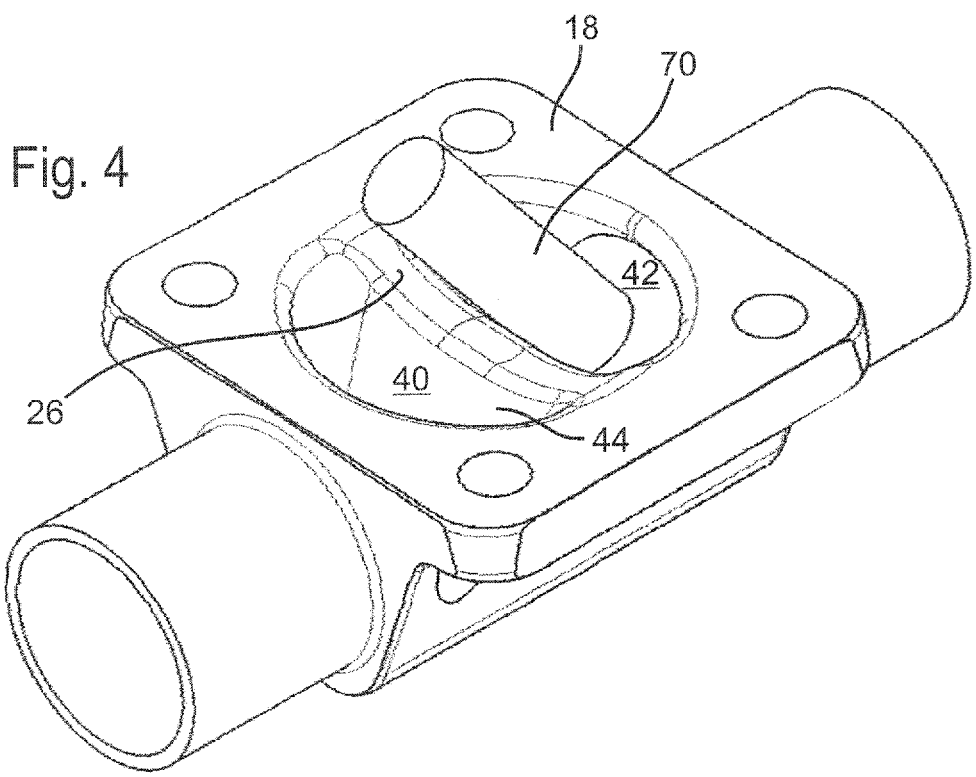
FIG. 4 shows a perspective view of the valve housing blank according to FIG. 1 during the milling of fluid passageways.
Figure 5:
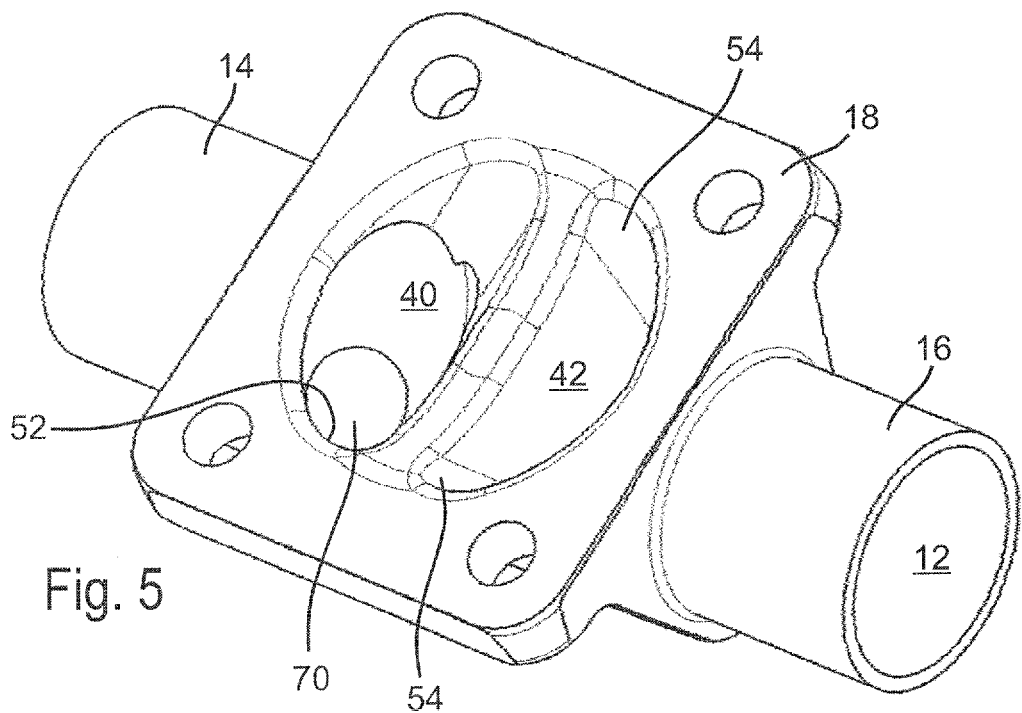
FIG. 5 shows a further perspective view of the valve housing blank during milling.

Subsequently, the passageway end sections 40, 42 are produced by milling, as can be seen in FIGS. 4 and 5. The cutter is here identified with reference numeral 70.

The cutter 70 is oriented obliquely to the level of the ring flange 18 and in this embodiment, there is not need to produce the corresponding opening by line milling, but preferably entirely by way of hobbing. And it is exactly the preferably level tapered sections 44, 46 that can be produced very rapidly.

As cutters, end-milling cutters may be used, which have a cylindrical outer contour, but a slightly conical outer contour is also possible. The cutter tip may optionally also have a spherical shape.

As can be seen in FIG. 5, the arc-shaped sections 52, 54 are very simply determined by the outer form of the cutter (turning point of the cutter movement), which is here simply traversed along a linear line, in order to form the tapered section, and subsequently along an arc, in order to produce the curved section of the kidney-shaped mouth opening 28, 30 and the corresponding wall section. In FIG. 5, only a part of the corresponding passage end section 40 is milled that is delimited by a thick line, whereas the milling of the passageway end section 42 has already been finished.

Subsequently, the surface can still be ground, which in the embodiment shown can exclusively be done by machine.

The embodiment according to FIGS. 8 to 10 corresponds, apart from the formation of the steeper section 48, 50, to the previous embodiment, so that only the differences need to be addressed below. The same reference numerals have been used as in the corresponding previous sections, parts or surfaces, so that reference can be made here throughout to the description provided above.

Figure 8:
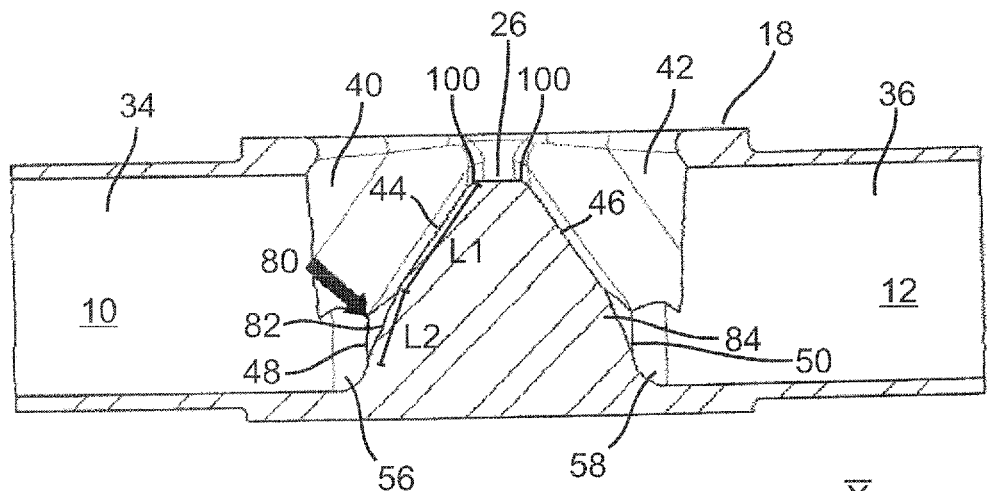
FIG. 8 shows a longitudinal sectional view through a second embodiment of a diaphragm valve housing according to the invention.
Figures 9, 10:
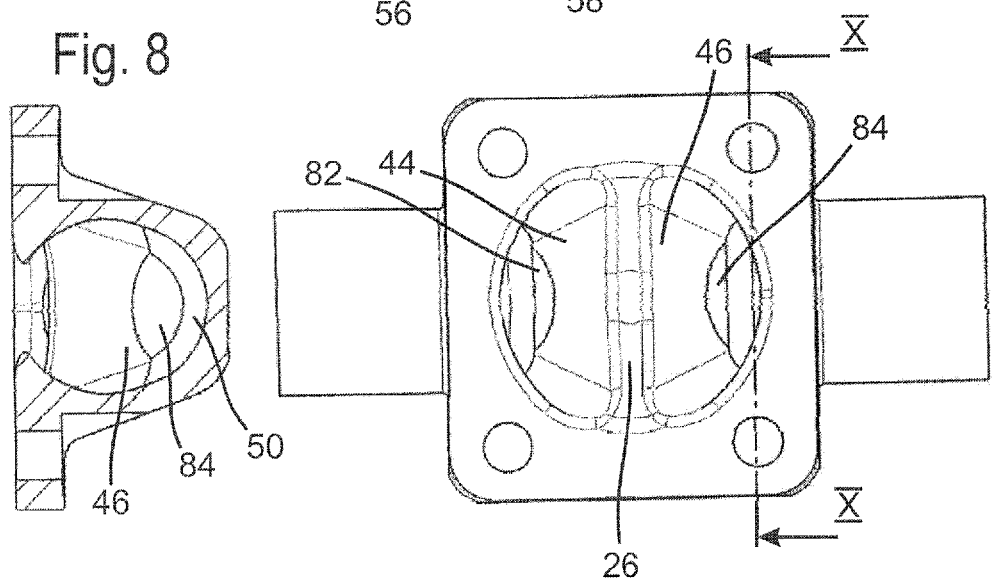
FIG. 9 shows a top view of the diaphragm valve housing according to FIG. 8.
FIG. 10 shows a radial sectional view through the diaphragm valve housing along the line X-X in FIG. 9.

Although in the embodiment according to FIGS. 8 to 10 the respective steeper section 48, 50 is identical in its basic form to the embodiment according to FIGS. 6 and 7, however, the edge 80 (see FIG. 8, arrow with reference numeral 80) has been milled off in sections, i.e. chamfered, in the region of the transition from the tapered section 44, 46 to the section 48, 50 that extends vertically to the level of the ring flange 18. FIG. 9 shows that as a result of the arc-shaped milling, the steeper section gets additional surfaces 82, 84. These sections 82, 84, too, are oriented steeper relative to the axial direction A than the corresponding tapered sections 44, 46.

As can further be seen from FIG. 9, the milled-out steep sections 82, 84, which extend in an arc-shaped manner, are present only in the region of the level areas of the tapered section 44, 46, i.e. following these, so that the arc-shaped sections 52, 54, like in the previous embodiment, merge directly into the arc-shaped sections 60, 62 of the steeper sections extending perpendicularly to the level of the ring flange 18.

In all embodiments, a curved edge 100, if viewed along the longitudinal section, connects the valve seat 26 with the adjacent tapered section 44, 46.

Further, if viewed in the longitudinal sectional view, the length L1 of the tapered section 44, 46 is greater than the length L2 of the following, steeper section 48, 50, 82, 84 (see FIG. 8).

The manufacturing of the diaphragm valve housing is carried out as in the embodiment described above. The only difference is that at the end of the process for manufacturing the passageway end sections 40, 42, the edge 80 is milled off in sections on both passageway end sections 40, 42 by orienting the cutter at an angle.

It is to be emphasised that the manufacturing of the cylindrical axial sections 34, 36 may in both embodiments of course also be carrier out at the end of the manufacturing process, so that the passageway end sections 40, 42 are produced at the beginning.

Moreover, the manufacturing of the diaphragm valve housing can also be carried out from a casting blank or from a forged stainless steel blank.

The invention claimed is:

1. A diaphragm valve housing comprising at least two axially extending fluid passageways, which are aligned with each other and which extend towards each other, a separation wall between the fluid passageways, which has a free end towards a valve chamber and with its free end forms a valve seat, which is located between mouth openings of the fluid passageways that are next to each other, wherein the fluid passageways each have a cylindrical axial section and a passageway end section, the passageway end sections following and extending laterally relative to the axial direction of the axial sections and obliquely in the direction of each other towards the valve chamber, the end sections being separated by the separation wall, wherein, the valve seat is solely formed by a top side of the separation wall facing towards the valve chamber, for delimiting the fluid passageways, the separation wall has for each fluid passageway, if viewed along an axial longitudinal section, a tapered section that is flatter with respect to the axial direction and is arranged immediately adjacent to the valve seat, a curved section, if viewed along the longitudinal section, connecting the valve seat with the tapered section, and a steeper section with respect to the axial direction which is located adjacent to the tapered section.

2. The diaphragm valve housing according to claim 1, wherein the tapered section is a plane surface.

3. The diaphragm valve housing according to claim 1, wherein the steeper section, at least in sections is, at least one of a cylindrical surface and a plane surface.

4. The diaphragm valve housing as claimed in claim 1, wherein the steeper section extends radially with respect to the axial direction.

5. The diaphragm valve housing as claimed in claim 1, wherein the steeper section forms a transition to the adjacent axial section of the fluid passageway.

6. The diaphragm valve housing as claimed in claim 1, wherein, if viewed in a top view onto the valve seat, the tapered section merges into arc-shaped sections at its lateral ends located transversely to the axial direction.

7. The diaphragm valve housing according to claim 6, wherein the arc-shaped sections merge into the steeper sections towards the axial section.

8. The diaphragm valve housing as claimed in claim 1, wherein the steeper section is made up from partial sections having different degrees of steepness to form an undercut.

9. The diaphragm valve housing as claimed in claim 1, wherein a lateral ring flange for attaching a diaphragm is integrally moulded to the housing, wherein the valve seat connects opposite sections of the ring flange to each other.

10. The diaphragm valve housing as claimed in claim 1, wherein, if viewed in a top view onto the ring flange, the fluid passageways have a semi-circular mouth opening.

11. The diaphragm valve housing as claimed in claim 1, wherein, if viewed in the longitudinal section, a curved edge connects the valve seat with the adjacent tapered section.

12. The diaphragm valve housing as claimed in claim 1, wherein, if viewed in the longitudinal section, the tapered section has a greater length than the steeper section that is arranged adjacent to the tapered section.

13. The diaphragm valve housing as claimed in claim 1, wherein the steeper section is formed, if viewed along the longitudinal section, by a straight section.

14. A diaphragm valve housing comprising at least two axially extending fluid passageways, which are aligned with each other and which extend towards each other, a separation wall between the fluid passageways, which has a free end towards a valve chamber and with its free end forms a valve seat, which is located between mouth openings of the fluid passageways that are next to each other, wherein the fluid passageways each have a cylindrical axial section and a passageway end section, the passageway end sections following and extending laterally relative to the axial direction of the axial sections and obliquely in the direction of each other towards the valve chamber, the end sections being separated by the separation wall, wherein, for delimiting the fluid passageways, the separation wall has for each fluid passageway, if viewed along an axial longitudinal section, a tapered section that is flatter with respect to the axial direction and is arranged immediately adjacent to the valve seat, and a steeper section with respect to the axial direction which is located adjacent to the tapered section, and a curved section, if viewed along the longitudinal section, connecting the valve seat with the tapered section, wherein the tapered section is formed, if viewed along the longitudinal section, by a straight section.

15. A diaphragm valve housing comprising at least two axially extending fluid passageways, which are aligned with each other and which extend towards each other, a separation wall between the fluid passageways, which has a free end towards a valve chamber and with its free end forms a valve seat, which is located between mouth openings of the fluid passageways that are next to each other, wherein the fluid passageways each have a cylindrical axial section and a passageway end section, the passageway end sections following and extending laterally relative to the axial direction of the axial sections and obliquely in the direction of each other towards the valve chamber, the end sections being separated by the separation wall, wherein, the valve seat is solely formed by a top side of the separation wall facing towards the valve chamber, for delimiting the fluid passageways, the separation wall has for each fluid passageway, if viewed along an axial longitudinal section, a tapered section having a planar surface that is flatter with respect to the axial direction and is arranged immediately adjacent to the valve seat, and a steeper section with respect to the axial direction which is located adjacent to the tapered section.

16. A diaphragm valve housing comprising at least two axially extending fluid passageways, which are aligned with each other and which extend towards each other, a separation wall between the fluid passageways, which has a free end towards a valve chamber and with its free end forms a valve seat, which is located between mouth openings of the fluid passageways that are next to each other, wherein the fluid passageways each have a cylindrical axial section and a passageway end section, the passageway end sections following and extending laterally relative to the axial direction of the axial sections and obliquely in the direction of each other towards the valve chamber, the end sections being separated by the separation wall, wherein, the valve seat is solely formed by a top side of the separation wall facing towards the valve chamber, for delimiting the fluid passageways, the separation wall has for each fluid passageway, if viewed along an axial longitudinal section, a tapered section that is flatter with respect to the axial direction and is arranged immediately adjacent to the valve seat, and a steeper section with respect to the axial direction which is located adjacent to the tapered section, wherein the steeper section is made up from partial sections having different degrees of steepness to form an undercut.

* * * * *